United States Patent [19]

Howard

[11] Patent Number: 5,435,094
[45] Date of Patent: Jul. 25, 1995

[54] FISHING SYSTEM AND FLOAT

[76] Inventor: William J. Howard, P.O. Box 573, Wilson, N.C. 27893

[21] Appl. No.: 186,709

[22] Filed: Jan. 25, 1994

[51] Int. Cl.$^6$ .............................................. A01K 93/00
[52] U.S. Cl. ................................... 43/43.13; 43/44.9
[58] Field of Search ................. 43/43.13, 44.9, 44.91, 43/42.74

[56] References Cited

U.S. PATENT DOCUMENTS

| | | | |
|---|---|---|---|
| 2,693,049 | 11/1954 | Atton | 43/44.9 |
| 2,797,521 | 7/1957 | Bowen | 43/43.13 |
| 2,798,331 | 7/1957 | Westdahl | 43/43.13 |
| 3,362,099 | 1/1968 | Morse | 43/43.13 |
| 3,908,300 | 9/1975 | Kuismi | 43/43.13 |
| 3,949,512 | 4/1976 | Stegemeyer | 43/43.13 |
| 4,798,021 | 1/1989 | Miklos | 43/43.13 |
| 4,893,433 | 1/1990 | Scheffler et al. | 43/44.91 |
| 5,165,196 | 11/1992 | Spickelmire | 43/43.13 |

*Primary Examiner*—Mark Rosenbaum
*Assistant Examiner*—Jeanne M. Elpel
*Attorney, Agent, or Firm*—David R. Murphy

[57] ABSTRACT

A fishing system for carrying a fishing line away from the wake of a vessel employing an improved float. The float has mating female and male halves in the form of a tube. Each half has an integral eccentric weight and a passage to receive a fishing line. The ends are tilted. The integral eccentric weight is carried by the inside of the tube. The passage passes from the tilted surface of the female half through to the tilted surface of the male half. The float is wholly of thermoplastic resin. The open end of the male half mates in a water-tight manner with the open end of the female half with the integral eccentric weight of the female half juxtaposed from the integral eccentric weight of the male half. Rotational displacement of the integral eccentric weight from the downwardmost position causes the weight to exert a righting moment on the float. The float can be manufactured by injection molding techniques.

6 Claims, 1 Drawing Sheet

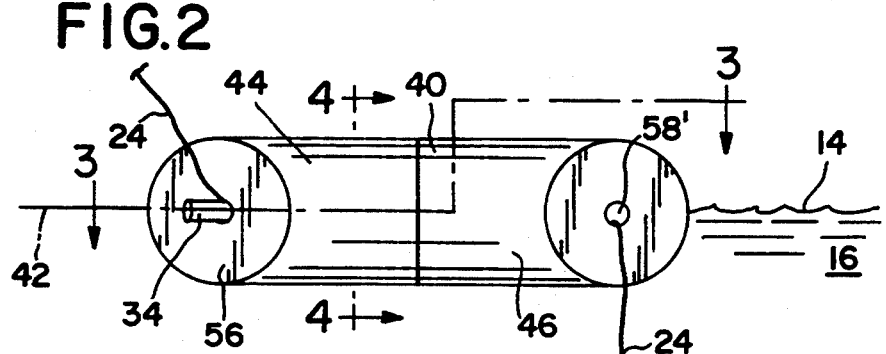
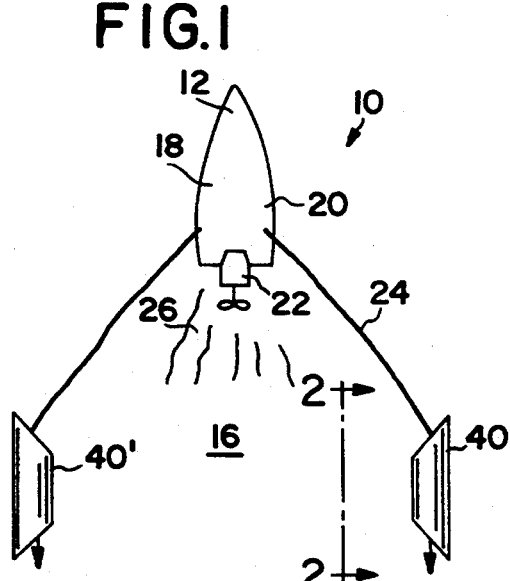
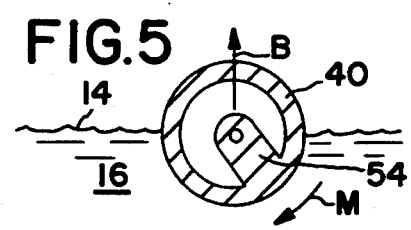
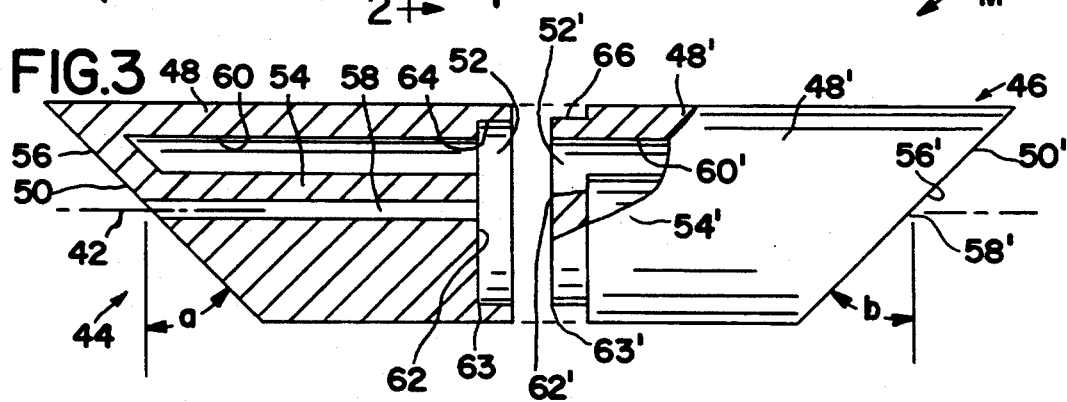

FISHING SYSTEM AND FLOAT

This invention relates to a fishing system and to a float useful in that system. Many fishermen, fishing from a vessel, desire to have their bait out of the wake of a the vessel by a distance greater than the length of the fishing rod. Other fisherman desire to take advantage of relative movement between the water and a float on the line to guide their bait to a particular area. There is a long felt need to supply fisherman with such an inexpensive fishing system. In an unsuccessful attempt to meet this need there has been a great deal of activity. This activity has resulted in the granting of a great number of United States Patents of which are the following:

Bowen, U.S. Pat. No. 2,797,521; and
Wesdahl, U.S. Pat. No. 2,798,331, and
Morse, U.S. Pat. No. 3,362,099, and
Kuismi, U.S. Pat. No. 3,908,300, and
Stegemeyer, U.S. Pat. No. 3,949,512, and
Miklos, U.S. Pat. No. 4,798,021, and
Spickelmire, U.S. Pat. No. 5,165,196.

Many, if not most, of these prior art devices admirably and efficiently perform the function of streaming the float away from the vessel. Unfortunately these devices suffer from a number of disadvantages.

Perhaps the greatest disadvantage in these prior art devices is the large number of components of each device. Each single component from the large number of components must be separately assembled. This assembly is labor intensive which increases the cost of these prior art floats. Any of the large number of components can come apart during fishing, causing the float to become inoperative.

Many of the prior art floats employ metal for a variety of reasons. Some floats are fashioned in whole or in part of metal. Metal is used to provide vanes and to eccentrically weight the float. Metal fasteners are used to attach the float to the line. Metal has a number of disadvantages when used in a hostile environment such as salt water or brackish water. The commonly used metals are brass, bronze, lead, aluminum, steel and stainless steel. Brass and bronze are expensive and corrode. Lead is harmful to the environment. Aluminum lacks sufficient strength and is subject to stress cracking. Steel corrodes. Stainless steel in expensive. The known prior art has failed to provide a float that is free of metal.

Injection molding is a notoriously well-known and widely-practiced technique for the production of an enormous variety of parts and components. None of the above described prior art floats can be produced by injection molding. This is because their structure does not lend itself to injection molding techniques. The structural elements present in these prior art floats that prevent their manufacture by injection molding techniques include among others: (a) the internal presence of metal weights or other metal parts; (b) the presence of bumps and crevices that would prevent extraction of the float from the mold, and (c) the presence of parts too thin to be self supporting.

Accordingly it is an object of the present invention to provide an improved fishing system which is substantially free of one or more of the disadvantages of the prior art.

Another object is to provide an improved float especially useful with the fishing system but also useful without a vessel.

Still another object is to provide an improved float which has only very few parts.

Still another object is to provide an improved float having only three parts.

Yet another object is to provide an improved float which is free of metal.

An additional object is to provide an improved float which is constructed completely of thermoplastic resin.

Yet another object is to provide an improved float which can be manufactured by injection molding techniques.

Still another object is to provide an improved float which can be quickly and inexpensively assembled.

Additional objects and advantages of the present invention will be readily apparent by reference to the description and the drawings wherein:

FIG. 1 is a top view of the improved fishing system of the present invention at a scale of about 1:100; and FIG. 2 is a side view of a float of the present invention taken along line 2—2 of FIG. 1 at a scale of about 1:1; and FIG. 3 is an exploded sectional view, at a slightly enlarged scale, of the float of FIG. 2 taken along line 3—3 of FIG. 2; and FIG. 4 is a sectional view of the float taken along line 4—4 of FIG. 2; and FIG. 5 is a sectional view of the float also taken along line 4—4 of FIG. 2 but with the float rotated to illustrate a righting moment inherent in its structure.

According to the present invention there is provided a fishing system for carrying a fishing line away from the wake of a vessel. The system includes a vessel, a fishing line and a float. The vessel is adapted to carry a fisherman over the surface of the water. The vessel has a port side, a starboard side, and a motor for propelling the vessel through the water thereby producing a wake. The fishing line is carried by the vessel and extends from the side of the vessel over the water to the float.

The float has a female half and a male half. The female half is in the form of a tube having a closed end, an open end and an integral eccentric weight between. The female half has a passage. The closed end is a tilted surface. The integral eccentric weight is carried by the inside of the tube. The open end has an inside surface adapted to receive the open end of the male half in a water-tight manner.

The male half is also in the form of a tube having a closed end, an open end, an integral eccentric weight between, and a passage. The closed end is a tilted surface. The integral eccentric weight is carried by the inside of the tube. The open end has a cylindrical outside surface adapted to receive the open end of the female half in a water-tight manner. The passage passes from the tilted surface of the female half through to the tilted surface of the male half.

The open end of the male half mates in a water-tight manner with the open end of the female half with the integral eccentric weight of the female half juxtaposed from the integral eccentric weight of the male half.

Referring now to the drawings in general and in particular to FIG. 1 there is shown a fishing system 10 for carrying a fishing line 24 away from the wake 26 of a vessel 12. The system 10 comprises a vessel 12 adapted to carry a fisherman (not shown) over the surface 14 of the water 16. The vessel 12 has a port side 18, a starboard side 20, and a motor 22 for propelling the vessel 12 through the water 16. The vessel 12 leaves a wake 26. A fishing line 24 is carried by the vessel 12 and extends from the starboard side 20 of the vessel 12 over the water 16.

As shown in FIG. 2, the line 24 goes through the float 40, and is attached to a hook 28 carrying bait 30 attractive to a fish 32. The line 24 can be fixed to the float 40 in any convenient manner as by the cylindrical rubber plug 34. The plug 34 provides a means for holding the fishing line 24.

Referring now to FIG. 3, wherein the line 24 and the plug 34 have been omitted for clarity the internal structure of the float 40 can be seen. The float 40 has a female half 44 and a male half 46.

The female half 44 is in the form of a cylindrical tube 48, having a closed end 50, an open end 52, an integral eccentric weight 54 therebetween, and a passage 58. The closed end 50 is a tilted surface 56, tilted at an angle "a" of less than 90° and preferably 45° to the centerline 42. An integral eccentric weight 54 is carried by the inside surface 60 of the cylindrical tube 48. The weight 54 extends radially inwardly from the inside surface 60 of the cylindrical tube 48, to a point past the centerline 42 of the cylindrical tube 48. The integral eccentric weight 54, terminates in a mating surface 62 lying in a plane 63 which is perpendicular to the centerline 42 of the float 40. The open end 52, has a cylindrical inside surface 64 adapted to receive the open end 52' of the male half 46 in a water-tight manner. The passage 58 lies in the center of the tilted surface 56 and is coincidental with the centerline 42 of the cylindrical tube 48 through the weight 54.

The float 40 also has a male half 46 also in the form of a cylindrical tube 48' having a closed end 50', an open end 52', an integral eccentric weight 54' therebetween, and a passage 58'. The closed end 50' is a tilted surface 56' tilted at an angle "b" of less than 90° and preferably 45° to the centerline 42. The integral eccentric weight 54' is carried by the inside surface 60' of the cylindrical tube 48' and extends radially inwardly from the inside surface 60' of the cylindrical tube 48' to a point past the centerline 42 of the cylindrical tube 48'. The integral eccentric weight 54' terminates in a mating surface 62' lying in a plane 63' perpendicular to the centerline 42 of the float 40. The open end 52' has a cylindrical outside surface 66 adapted to receive the cylindrical inside surface 64 of the open end 52 of the female half 44 in a water-tight manner. The float 40 can be made water-tight by any convenient means. One means is to place adhesive tape (not shown) around the joint between the two halves 44, 46. Another is to spread glue on the surfaces 62, 62' 64, and/or 66.

The passage 58, 58' lie in the center of the tilted surfaces 56, 56' and is coincidental with the centerline 42 of the cylindrical tubes 48, 48'. The passage 58, 58' passes through the weights 54, 54'.

The open end 52' of the male half 46 mates in a water-tight manner with the open end 52, of the female half 44 with the integral eccentric weight 54, of the female half 44 juxtaposed from the integral eccentric weight 54' of the male half 46 and the passage 58 in the female half 44 aligned with the passage 58' in the male half 46.

The passages 58, 58' have a uniform cross section throughout their entire length from the tilted surface 56 on the female half 44 to the tilted surface 56' on the male half 46. This permits the float 40 to be manufactured by injection molding techniques.

The inside diameter of the cylindrical tube 48 of the female half 44 is at least equal to the smallest diameter of the cylindrical tube 48 within the female half 44. This also facilitates the use of injection molding techniques.

The inside diameter of the cylindrical tube 48' of the male half 46 is at least equal to the smallest diameter of the cylindrical tube 48' within the male half 46 required if the float 40 is to be manufactured by injection molding techniques.

As shown in FIG. 4 when the weight 40 is at the bottommost position the buoyant force "B" keeps the float upright. However as shown in FIG. 5 if the float 40 is rotated counter clockwise the weight 54 is displaced from the equilibrium position of FIG. 4. This causes the weight 54 to exert a righting moment "M" on the float 40. This occurs whenever the weights 54, 54' are in any position other than at the bottommost position. This righting moment "M" keeps the tilted surface 56 of the float 40 facing the vessel 12. The buoyant force "B" of the water 16 on the float 40 keeps the float 40 at the surface 14 of the water 16.

The float 40 can be used without a vessel 12 as long as there is relative movement between the water 16 and the float 40. Thus a fisherman standing in a still-water lake could take advantage of the structure of the float 40 and could cast it a distance. Relative movement between the water 16 and the float 40 is achieved by reeling in the line 24. Furthermore a fisherman standing near the stream bed of a fresh-water mountain stream could take advantage of the structure of the float 40 and could simply place it in the moving water without reeling in the line. Relative movement between the water 16 and the float 40 is achieved by the water moving over the stream bed.

The float 40 can have a cross section of a polygon of three or more sides. It preferably has a cross section of a polygon having an infinite number of sides namely a circle. In this preferred embodiment the tube of the float 30 is cylindrical as shown.

In a preferred embodiment the float 40 of is completely free of metal. In another embodiment it is wholly of thermoplastic resin.

The float 40 can be manufactured from a wide variety of thermoplastic resins. Virtually any resin known to be useful for injection molding can be employed. The selection of specific resins is well within the ability of the man of ordinary skill in the injection molding art. Examples of suitable resins include among others, polyethylene, polypropylene, polyester such as poly(ethylene terephthalate) and nylon such as nylon 6, 10, acrylic polymers such as poly(methylmethacrylate) an polycarbonates such as those sold under the trade name Lexan. The most preferred resin is polycarbonate.

The resins can be employed in their pure form or admixed with varying amounts of dyes, pigments, opacifiers, plasticizer, fillers, fibers and ultraviolet light adsorbents.

Although the invention has been described in considerable detain with respect to a preferred embodiment thereof, it will be understood that modifications can be effected without departing from the spirit of the invention as defined in the appended claims.

What is claimed is:

1. A fishing system for carrying a fishing line away from the wake of a vessel traveling across water having a surface comprising:

I. a vessel adapted to carry a fisherman over the surface of the water; said vessel having a port side, a starboard side, and a motor for propelling the vessel through the water thereby producing said wake; and II. a fishing line carried by the vessel and extending from the starboard side of the vessel over the water; and III. a fishing float comprising:
   A. a female half in the form of a tube, having an inside, an outside, a closed end, an open end, an integral eccentric weight between the closed end and the open end, and a passage wherein:
      (1) the closed end is a tilted surface;
      (2) the integral eccentric weight is carried by the inside of the tube;
   B. a male half in the form of a tube having an inside, an outside, a closed end, an open end, an integral eccentric weight between the closed end and the open end, and a passage wherein:
      (1) the closed end is a tilted surface;
      (2) the integral eccentric weight is carried by the inside of the tube;
   wherein the open end of the female half is adapted to receive the open end of the male half in a water-tight manner;
   wherein the passage passes from the tilted surface of the female half through to the tilted surface of the male half;
   wherein said float is wholly of thermoplastic resin;
   wherein the open end of the male half mates in a water-tight manner with the open end of the female half with the integral eccentric weight of the female half juxtaposed from the integral eccentric weight of the male half;
   wherein rotational displacement of the integral eccentric weight of the female half and the integral eccentric weight of the male half from a downwardmost position causes a righting moment on the float.

2. The fishing system of claim 1 further comprising means for holding the fishing line to the float.

3. A fishing float comprising:
   A. a female half in the form of a tube having an inside, an outside, a closed end, an open end, an integral eccentric weight therebetween, and a passage wherein:
      (1) the closed end is a tilted surface;
      (2) the integral eccentric weight is carried by the inside of the tube;
   B. a male half in the form of a tube having an inside, an outside, a closed end, an open end, an integral eccentric weight therebetween, and a passage wherein:
      (1) the closed end is a tilted surface;
      (2) the integral eccentric weight is carried by the inside of the tube;
   wherein the open end of the female half is adapted to receive the open end of the male half in a water-tight manner;
   wherein the passage passes from the tilted surface of the female half through to the tilted surface of the male half;
   wherein said float is wholly of thermoplastic resin;
   wherein the open end of the male half mates in a water-tight manner with the open end of the female half with the integral eccentric weight of the female half juxtaposed from the integral eccentric weight of the male half;
   wherein rotational displacement of the integral eccentric weight of the female half and the integral eccentric weight of the male half from a downwardmost position causes the integral eccentric weight of the female half and the integral eccentric weight of the male half to exert a righting moment "M" on the float.

4. The float of claim 3 completely free of metal.

5. The float of claim 3 having a centerline wherein the tilted surface is tilted to the centerline by an angle of 45°.

6. A fishing float for use with a wake-producing vessel used to transport a fisherman across a body of water having a surface, said vessel having a port side and a starboard side, said float having a centerline and comprising:
   A. a female half in the form of a cylindrical tube having a centerline, an inside, an outside, a closed end, an open end, an integral eccentric weight therebetween, and a passage wherein:
      (1) the closed end is a tilted surface, tilted at an angle "a" of less than 90° to the centerline;
      (2) the integral eccentric weight is carried by the inside surface of the cylindrical tube and extends radially inwardly from the inside surface of the cylindrical tube, to a point past the centerline of the cylindrical tube; said integral eccentric weight, terminating in a mating surface lying in a plane perpendicular to the centerline of the float;
      (3) the passage lies in the center of the tilted surface and is coincidental with the centerline of the cylindrical tube;
   B. a male half in the form of a cylindrical tube having a closed end, an open end, an integral eccentric weight therebetween, and a passage wherein:
      (1) the closed end is a tilted surface tilted at an angle "b" of less than 90° to the centerline;
      (2) the integral eccentric weight is carried by the inside surface of the cylindrical tube and extends radially inwardly from the inside surface of the cylindrical tube to a point past the centerline of the cylindrical tube; said integral eccentric weight terminating in a mating surface lying in a plane perpendicular to the centerline of the float;
      (3) the passage lies in the center of the tilted surfaces and is coincidental with the centerline of the cylindrical tube;
   wherein said float is wholly of thermoplastic resin;
   wherein the open end of the male half mates in a water-tight manner with the open end of the female half;
   wherein the integral eccentric weight of the female half is juxtaposed from the integral eccentric weight of the male half and the passage in the female half is aligned with the passage in the male half;
   wherein the passages have a uniform cross section throughout their entire length from the tilted surface on the female half to the tilted surface on the male half;
   wherein displacement of the weights from the centerline of the float causes the weights to exert a righting moment "M" on the float whenever the weights are in any position other than at a downwardmost position;
   whereby the righting moment "M" keeps a tilted surface of the float facing the vessel;
   whereby the buoyant force "B" of the water on the float keeps the float at the surface of the water.

* * * * *